(12) United States Patent
Hubert et al.

(10) Patent No.: US 11,007,738 B2
(45) Date of Patent: May 18, 2021

(54) MOLD FOR MANUFACTURING A SOLE

(71) Applicant: WERKZEUGBAU SIEGFRIED HOFMANN GMBH, Lichtenfels (DE)

(72) Inventors: Rene Hubert, Lichtenfels (DE); Huu Minh Tru Le, Herzogenaurach (DE); Christopher Robertson, Herzogenaurach (DE); Christopher Edward Holmes, Herzogenaurach (DE); Maximilian Philipp Kurtz, Herzogenaurach (DE); Christian Richardt, Lichtenfels (DE)

(73) Assignee: WERKZEUGBAU SIEGFRIED HOFMANN GMBH, Lichtenfels (DE)

( * ) Notice: Subject to any disclaimer, the term of this patent is extended or adjusted under 35 U.S.C. 154(b) by 0 days.

(21) Appl. No.: 16/765,607

(22) PCT Filed: Aug. 7, 2018

(86) PCT No.: PCT/EP2018/071384
§ 371 (c)(1),
(2) Date: May 20, 2020

(87) PCT Pub. No.: WO2019/101375
PCT Pub. Date: May 31, 2019

(65) Prior Publication Data
US 2020/0298520 A1    Sep. 24, 2020

(30) Foreign Application Priority Data
Nov. 22, 2017 (EP) .................... 17203128

(51) Int. Cl.
*B29D 35/12* (2010.01)
*B29D 35/00* (2010.01)
(Continued)

(52) U.S. Cl.
CPC .......... *B29D 35/122* (2013.01); *A43B 13/187* (2013.01); *B29D 35/0018* (2013.01);
(Continued)

(58) Field of Classification Search
CPC  B29D 35/0063; B29D 35/122; B29D 35/128; B29D 35/142
See application file for complete search history.

(56) References Cited

U.S. PATENT DOCUMENTS 1,855,098 A    4/1932  Russell
3,813,201 A    5/1974  Frederick et al.
(Continued)

FOREIGN PATENT DOCUMENTS

DE    102013108053    1/2015
EP    2786670         10/2014
(Continued)

OTHER PUBLICATIONS

Abstract and figure of CN-205021904 U dated Feb. 2016. (Year: 2016).*
(Continued)

*Primary Examiner* — Robert B Davis
(74) *Attorney, Agent, or Firm* — Greenblum & Bernstein, P.L.C.

(57) ABSTRACT

The present invention relates to a mold for manufacturing a sole from a plurality of particles.

12 Claims, 7 Drawing Sheets

(51) Int. Cl.
*B33Y 80/00* (2015.01)
*A43B 13/18* (2006.01)
*B29K 105/00* (2006.01)

(52) U.S. Cl.
CPC ............ *B29D 35/128* (2013.01); *B33Y 80/00* (2014.12); *B29K 2105/251* (2013.01)

(56) References Cited

U.S. PATENT DOCUMENTS

| | | | |
|---|---|---|---|
| 5,314,927 A * | 5/1994 | Kondo | B32B 27/10 521/159 |
| 5,667,737 A | 9/1997 | Wittmann | |
| 6,800,227 B1 * | 10/2004 | Nohara | B29C 44/445 264/126 |
| 2009/0072436 A1 | 3/2009 | Dean | |
| 2012/0306125 A1 | 12/2012 | Dean | |
| 2015/0336298 A1 | 11/2015 | Dean | |
| 2016/0001476 A1 * | 1/2016 | Sommer | B29C 44/3496 264/54 |
| 2017/0341325 A1 | 11/2017 | Le et al. | |

FOREIGN PATENT DOCUMENTS

| | | |
|---|---|---|
| EP | 3248770 | 11/2017 |
| GB | 1063353 | 3/1967 |
| JP | 11129275 A * | 5/1999 |
| WO | WO2009/036240 | 3/2009 |

OTHER PUBLICATIONS

International Search Report issued in International Patent Application No. PCT/EP2018/071384, dated Oct. 12, 2018.
Written Opinion issued in International Patent Application No. PCT/EP2018/071384, dated Oct. 12, 2018.

* cited by examiner

MOLD FOR MANUFACTURING A SOLE

1. TECHNICAL FIELD

The present invention relates to a mold for manufacturing a sole from a plurality of particles.

2. DESCRIPTION OF THE PRIOR ART

Shoe soles, in particular midsoles, are usually manufactured from polymers such as ethylene-vinyl acetate (EVA). A standard manufacturing process for such polymers comprises injection molding the sole material into a conventional injection molding mold.

As the requirements on soles become more challenging in order to provide improved performance properties, in particular enhanced cushioning properties, new sole materials have been developed.

However, conventional molds for molding a sole are not adapted to the specific requirements when molding a sole made from particles, particularly expandable or expanded particles, in satisfying manner. For example, the particle molding process with a conventional mold requires a large amount of energy for heating the mold, as conventional molds typically have a high mass. Moreover, the cooling process of such molds is slow and therefore, leads to extended cycle times.

Finally, molding soles from particles requires to uniformly supplying a gaseous or liquid medium to the particles, particularly expandable or expanded particles, in order to achieve a homogeneous interconnection of the particles. Conventional molds are not adapted to such a uniform medium supply.

Therefore, the underlying problem of the present invention is to provide a mold for manufacturing a sole, which mold is capable to at least partly overcome the above-mentioned deficiencies of conventional molds for molding soles from particles.

3. SUMMARY OF THE INVENTION

The above-mentioned problem is at least partly solved by a mold according to claim 1. The mold (which may also be deemed or denoted as sole mold) is configured to manufacture at least one sole, particularly a shoe sole, from a plurality of particles, particularly expanded or expandable particles. Respective particles may be made from an expanded or expandable material such as expanded thermoplastic polyurethane. It is also conceivable that any other appropriate particles may be used, for example, any other particle foam suitable for the manufacture of soles, for example, ePEBA (expanded polyetherblockamide) or ePA (expanded polyamide).

In one embodiment, the mold comprises at least one first opening for supplying the particles, and at least two second openings for supplying a gaseous and/or liquid medium, e.g. steam, to bond and/or fuse together the particles, wherein at least a portion of the mold is manufactured by an additive manufacturing method or process, respectively.

A sole which is manufacturable or to be manufactured with the mold may be a multi-layered sole, i.e. a sole comprising an outsole (first layer) and a mid-sole (second or further layer) attached to the outer-sole, i.e. particularly bonded and/or fused to the outsole. At least the mid-sole is made of respective particles. A respective outsole may be a pre-manufactured component.

The mold may comprise at least a first mold part (first part of the mold) and a second mold part (second part of the mold). The first mold part may be deemed or denoted as first mold halve. The second mold part may be deemed or denoted as second mold halve. The first mold part may be a top part of the mold. The second mold part may be a bottom part of the mold. At least one mold part may be built as or comprise a shaping contour at least partly representing the shape of the sole manufacturable or to be manufactured with the mold. The shaping contour(s) of the respective mold part(s) may be defined by a recessed structure and/or projecting structure in the respective mold part(s). The shaping contour(s) of the respective mold part(s) may be defined or delimited, respectively by walls or wall portions, particularly base walls or base wall portions and/or side walls or side wall portions extending off the base walls or base wall portions, of the respective mold parts.

It is also possible that a respective shaping contour is provided with a mold insert which is to be inserted in a respective receiving section of the mold being configured to receive a respective mold insert. In such a case, the mold insert may at least partly be additively manufactured. The mold may thus, comprise at least one mold insert.

In either case, the shaping contour(s) of the mold part(s) or insert(s) may define a mold cavity. The mold cavity may essentially form the negative of the sole manufacturable or to be manufactured with the mold.

The at least two mold parts may be moveably supported relative to each other at least between a first position corresponding to an open position or state, respectively of the mold allowing access to the mold cavity, and a second position corresponding to a closed position or state, respectively of the mold not allowing access to the mold cavity. In other words, at least one mold part is moveably supported relative to at least one other mold part at least between a respective first position and a respective second position. A respective motion of the at least one moveable mold part may occur along at least one, particularly translational, motion axis.

The first and/or second openings of the mold may be provided with respective first and/or second mold parts. In other words, each mold part may be provided with a number of, particularly a plurality of, first and/or second openings. As will be apparent from below, respective first and/or second openings may be uniformly or non-uniformly distributed at a respective surface of the respective first and/or second mold part.

The first and/or second openings may have a circular cross-sectional shape; respective first and/or second openings may thus, particularly be implemented as (circular) bores. Yet, the first and/or second openings may be provided with other cross-sectional shapes, e.g. non-circular shapes, particularly polygonal shapes; respective first and/or second openings may thus, be particularly implemented as (square or rectangular) slits. Yet, respective first and/or second openings may also be implemented as triangles, i.e. with a triangular cross-section, which may have special advantages in terms of the structural properties of the mold. Independent of its concrete cross-sectional shape, a respective first opening typically differs from a respective second opening in that the cross-sectional area of the first opening is bigger than the cross-sectional area of the second opening.

At least a portion of the mold or at least a portion of mold parts of the mold respectively, in particular the entire mold or the entire mold parts, are additively manufactured, i.e. manufactured by means of an additive manufacturing method or process, respectively. The mold described herein thus allows for a fundamentally new approach for manufacturing soles, in particular shoe soles, made by molding of particles, in particular molding of expandable or expanded particles. By manufacturing at least a portion of the mold, in particular the entire mold, by means of an additive manufacturing method, i.e. by using an additive manufacturing method for manufacturing at least a portion of the mold, in particular the entire mold, the mass of the mold can be significantly reduced without deteriorating the mold's structural properties, i.e, in particular mechanical stability, during its operation and use, respectively. As a consequence, the heat capacity of the mold is also significantly reduced and therefore, also the loss of energy when heating the mold may be reduced. The reduced mass of the mold improves the tempering process, e.g, heating and/or cooling process, as the reduced heat capacity may accelerate the tempering, i.e. heating and/or cooling, which may be further supported by an open (internal) structure of the mold that can be easily realized via additive manufacturing of the mold. All of this may lead to reduced cycle times, particularly when manufacturing a plurality of soles with the mold.

The additive method or process for manufacturing the mold may comprise a successive layerwise selective irradiation and consolidation of build material layers which can be consolidated by means of an energy beam. Respective build material layers may be layers of a build material powder. A respective build material powder may comprise at least one of a metal powder, a ceramic powder, or a polymer powder, for instance. A respective energy beam may be an electron beam or a laser beam, for instance. The method may thus, be implemented as a selective electron beam melting process or a selective laser melting process, for instance.

However, other additive manufacturing methods such as 3D printing, stereolithography, direct metal laser sintering, fused deposition modeling, metal binder jetting, etc. can alternatively or in addition be used to manufacture the mold.

The additive manufacturing of the mold also enables the provision of customized/optimized and/or fine, particularly geometrical, structures, e.g. recesses and/or projections, on the surface of the mold, for example, a high number of comparatively small second openings wherein up to 50%, preferably up to 60% and more preferably up to 70%, of the surface may be provided with second openings. A well-defined regular or irregular distribution of second openings over at least part of the surface of the mold or a respective mold part may improve the homogenous distribution of the inflow of the gaseous and/or liquid medium. As a result, a uniform supply of the gaseous and/or liquid medium may be achieved so that the particles of the sole are uniformly interconnected leading to a high-quality sole.

In one embodiment, the at least two second openings are smaller than the average size of the particles to be molded in the mold in at least one dimension. For example, the at least two second openings may be provided with a smallest dimension of up to 5.0 mm, preferably of up to 4.0 mm, preferably up to 3.0 mm and more preferably 0.1 mm to 1 mm. Second openings with such dimensions provide a reasonable compromise between an effective supply of liquid and/or gas without having large unsupported surface regions in the mold, which could lead to uneven surfaces of the sole to be manufactured. Moreover, it has been found that second openings having respective dimensions may also contribute to the reduction of the cycle time of the molding process by further reducing the heat capacity of the mold. Finally, second openings having respective dimensions avoid production waste as essentially no particles can leave the mold through the second openings.

In one embodiment, the mold may further comprise three-dimensional textures on its surface to provide structural features to the surface of the sole. Respective three-dimensional textures can comprise, by way of example only, contoured lines, indented lines, patterns and other such design elements. Respective three-dimensional textures may be additively built; thus, arbitrary three-dimensional textures may be realized.

In one embodiment, at least a portion of the mold comprises a thickness of equal or less than 10 mm, preferably equal or less than 6 mm and more preferably equal or less than 3 mm. A respective portion may for example be provided in a side wall of the mold or a respective mold part. In a more specific embodiment, a respective portion may comprise essentially the complete mold or a complete mold part. In this context and also in the following, the term "essentially" refers to typical product tolerances in the technical field of the present invention.

The indicated exemplary values for the thickness and for the dimensions of the second openings can be easily achieved by additive manufacturing. They have been found to provide a reasonable compromise between the conflicting requirements to reduce the heat capacity of the mold and to provide sufficient (mechanical) stability so that the mold can permanently resist the pressure and thermal stress during its operation and use, i.e. during molding.

As mentioned above, the sole may comprise at least a first and a second mold part. As also mentioned above, at least one mold part may comprise a shaping contour at least partly representing the shape of the sole manufacturable or to be manufactured with the mold. The shaping contour(s) of the respective mold part(s) may be defined or delimited, respectively by wall portions, particularly side wall portions, of the respective mold part(s). Second openings may be particularly provided in respective wall portions, particularly respective side wall portions, of the respective mold part(s).

Providing second openings in both the first and second mold part, particularly including respective side wall portions of the first and second mold parts, may improve the supply of the gaseous and/or liquid medium to bond and/or fuse the particles and thus, bonding and/or fusing the particles so as to form the sole. This may lead to a sole having even more homogeneous properties as the bonding/fusing together of the particles does not significantly vary throughout the sole.

The supply, particularly inflow, of the gaseous and/or liquid medium through the second openings may generally be selectively controlled. For example, the gaseous and/or liquid medium may be supplied through a first group of second openings, e.g. in the first and/or second mold part, and may be removed through a second group of second openings e.g. in the first and/or second mold part. As such, the gaseous and/or liquid medium may be supplied through second openings not provided in a side wall or side wall portion of a first mold part, e.g. in a top part, and through second openings not provided in a side wall or side wall portion of a second mold part, e.g. in a bottom part, and may be removed by second openings provided in a side wall or side wall portion of the first mold part and/or the second mold part.

The mold may further comprise at least one recess and/or at least one projection configured to hold and/or position a pre-manufactured outsole in the mold. As least a group of second openings may be arranged adjacent to the at least one recess and/or at least one projection. The at least one recess and/or the at least one projection may be additively built. Providing a respective recess and/or projection allows to combine the molding of a midsole from particles with the bonding of the midsole to the outsole in a single processing step. To this end, the outsole may be held and/or positioned within one or more recesses and/or held and/or positioned by means of one or more projections. The particles may then be supplied by the at least first opening, bonded and/or fused together by the gaseous and/or liquid medium from the second openings in order to form the midsole, whereby they are connected to the pre-manufactured outsole.

As mentioned above, the second openings may be arranged in an essentially regular pattern. The inventors have found that an essentially regular pattern may provide a high quality of the molded particles as essentially the same amount of energy provided by the gaseous and/or liquid medium can be absorbed by the particles throughout the sole area corresponding to the regular pattern. Arranging the second openings in a regular pattern typically includes an equidistant arrangement of second openings, i.e. the distance between adjacent second openings is the same throughout the respective pattern.

The mold may further comprise a means for closing the at least first opening. A respective means may be built as or comprise at least one closing element, e.g. a slide element, which is moveably supported relative to the first opening between a first position corresponding to an open position or state, respectively of the first opening allowing to supply particles into the mold, particularly into the mold cavity, and a second position corresponding to a closed position or state, respectively of the first opening not allowing to supply particles into the mold, particularly into the mold cavity. A respective motion of the at least one moveable closing element may occur along at least one, particularly translational, motion axis.

The mold may comprise a means for holding a functional element of the sole, e.g. a mechanical supporting and/or stiffening element of the sole, inside the mold. For example, the top part and/or the bottom part of the mold may include means for holding a respective functional element, e.g. a mechanical supporting and/or stiffening element, which may be placed inside the particles (after supplying the particles) so that it is at least partially integrated in the molded sole and can thus provide extra functionality, particularly extra stability, to the sole.

The mold may further comprise at least one means for ejecting a manufactured sole from the mold. A respective means may be built as or comprise at least one ejecting element, e.g. an ejecting pin element, which is moveably supported relative to the mold between a first position corresponding to an retracted position or state, respectively not allowing to eject a manufactured sole from the mold, particularly the mold cavity, and a second position corresponding to an extended position or state, respectively allowing to eject a manufactured sole from the mold, particularly the mold cavity. A respective motion of the at least one moveable ejecting element may occur along at least one, particularly translational, motion axis. The ejecting means may support an automation of the molding process, as the manufactured sole may be automatically ejected after molding for further processing.

The invention further relates to an arrangement of a plurality of molds as specified above. Combining several molds may allow for automatically manufacturing a plurality of soles in a single production step and thus, increases productivity. The infrastructure to supply the molds with the gaseous and/or liquid medium may be shared among several molds leading to lower overall costs for the automated manufacture of a large number of soles. All annotations regarding the mold apply to the arrangement of a plurality of soles in analogous manner.

The invention further relates to an apparatus for manufacturing a sole. The apparatus comprises a mold as specified above or an arrangement of a plurality of molds as specified above; and a chamber—which may be deemed or denoted as steam chamber—for generating and/or supplying a gaseous and/or liquid medium, particularly steam, to bond and/or fuse particles. The chamber comprises at least one inner chamber volume which is fillable or filled with the gaseous and/or liquid medium, particularly steam, and at least one receiving section, particularly a recess, for at least partly receiving the mold, particularly a first part of the mold, preferably a top part of the mold, or a second part of the mold, preferably a bottom part of the mold. All annotations regarding the mold and/or the arrangement of molds apply to the apparatus in analogous manner and vice versa.

As mentioned before, the apparatus comprises at least one chamber for generating and/or supplying a gaseous and/or liquid medium, particularly steam. The chamber comprises at least one inner chamber volume which is fillable or filled with the gaseous and/or liquid medium, particularly steam, to be generated and/or supplied to the mold or mold cavity, respectively. The inner chamber volume is delimited by walls of the chamber (chamber walls). The inner chamber volume may be tempered, i.e. particularly heated to a specific (heating) temperature allowing for generating the gaseous and/or liquid medium, particularly steam, which is to be supplied to the mold, and/or cooled to a specific (cooling) temperature. Hence, the chamber may be provided with a tempering means, i.e. a heating and/or cooling means, configured to temper the chamber or the inner chamber volume, respective so as to temper a medium contained within the inner chamber volume.

As mentioned before, the chamber further comprises at least one receiving section, particularly a recess in a wall element of the chamber, for at least partly receiving the mold, particularly a first mold part, e.g. a top part of the mold, or a second mold part, e.g. a bottom part of the mold. The number of receiving sections provided with the chamber is typically defined by the number of mold parts of the mold. For the exemplary case of two mold parts, the chamber comprises two receiving sections; a first mold part is or may be received in a first receiving section, a second mold part is or may be received in a second receiving section. The shape of the receiving sections of the chamber typically corresponds to the shape of the mold parts to be received in the receiving sections so that the mold parts may be nested within the receiving sections. By receiving respective mold parts in respective receiving sections, a (mechanical) coupling of the respective mold parts with the respective receiving sections is given.

The chamber may comprise at least a first chamber part and a second chamber part. The first chamber part may be deemed or denoted as first chamber halve. The second chamber part may be deemed or denoted as second chamber halve. The first chamber part may be a top part of the chamber, the second chamber part may be a bottom part of the chamber. Each chamber part may comprise an inner chamber part volume. The inner chamber part volume is delimited by walls of the respective chamber part (chamber part walls). The chamber part walls may be provided with a tempering channel structure for a tempering medium, the streaming channel structure comprising at least one tempering channel at least partly extending through the respective chamber part wall, A tempering medium, e.g. a tempering gas and/or liquid, for tempering the respective chamber part may stream within the tempering channel. The inner chamber part volumes of the respective chamber parts typically, define the chamber volume of the chamber. Each chamber part may comprise an at least one receiving section; i.e. each chamber part may receive at least one mold part.

The at least two chamber parts may be moveably supported relative to each other at least between a first position corresponding to an open position or state, respectively of the chamber allowing access to the mold cavity and a second position corresponding to a closed position or state, respectively of the chamber not allowing access to the mold cavity. In other words, at least one chamber part is moveably supported relative to at least one other chamber part at least between a respective first position and a respective second position. As mentioned before, each chamber part comprises at least one receiving section for receiving a mold part. Receiving respective mold parts in respective receiving sections of respective chamber parts results in a (mechanical) coupling of the mold parts with the respective chamber parts, Due to the (mechanical) coupling, motions of the chamber parts (relative to each other) result in motions of the mold parts (relative to each other). In other words, the moveable support of the mold parts relative to each other may be implemented by the moveable support of the chamber parts relative to each other. A respective motion of the at least one moveable chamber part may occur along at least one, particularly translational, motion axis which corresponds to the motion axis of the mold parts.

The apparatus may comprise a drive device, e.g. built as an or comprising an (electro)hydraulic drive, for generating a drive force for moving the at least one chamber part and/or mold part, respectively along the respective motion axis. The drive device is thus, directly or indirectly couplable or coupled with the at least one chamber part and/or mold part, respectively so as to set the at least one chamber part and/or mold part, respectively in a motion along the respective motion axis.

The apparatus may further comprise at least one guiding device allocated to the at least one chamber part being moveably supported and/or the at least one mold part being moveably supported. The guiding device may be configured to allow for a guided motion of the respective chamber part or mold part, respectively along the respective motion axis. The guiding device may comprise at least one guiding element, e.g. a guiding rod or the like, being couplable or coupled with the respective chamber part and/or mold part, respectively so as to allow for a guided motion of the chamber part and/or mold part, respectively along the respective motion axis.

The apparatus may further comprise a particle supplying device configured to supply particles to the mold, i.e. to a mold cavity. The particle supplying device may comprise at least one particle supplying element. The particle supplying element may be built as or comprise a particle injector element. The particle supplying device may thus also be deemed or denoted as a particle injecting device. The particle supplying or particle injecting device, respectively may at least partly be disposed within or may at least partly extend through the inner chamber volume.

The particle supplying or particle injecting device, respectively may at least partly extend or be extended into a first opening of the mold or a mold part, respectively in order to supply particles to the mold or mold cavity, respectively.

The chamber may also be at least partly, particularly entirely, additively manufactured. In other words, the chamber may be at least partly, particularly entirely, an additively manufactured component. Additively manufacturing the chamber allows for integrating diverse geometrical and/or functional features in the chamber. In particular, the inner chamber volume and the receiving section(s) may be integrated in the chamber by additive manufacturing.

The same applies to respective chamber parts. Thus, respective chamber parts including respective inner chamber part volumes and receiving sections may be at least partly, particularly entirely, additively manufactured.

According to a special embodiment, the mold may be at least partly, particularly entirely, integrated in the chamber (or vice versa) by additive manufacturing. Hence, the chamber and the mold may be built as at least one common additive component. This means with respect to respective chamber parts and mold parts that at least one mold part may be integrated in a respective chamber part by additive manufacturing. The chamber part and the at least mold part may thus form one common additive component.

As is apparent from the above, the apparatus may at least partly, particularly entirely, be additively manufactured.

The invention further relates to a method for manufacturing at least one sole from a plurality of particles, particularly expanded or expandable particles, wherein a mold as specified above or an arrangement of a plurality of molds as specified above or an apparatus as specified above is used for manufacturing the sole. In other words, the invention also relates the use of a mold as specified above or an arrangement of a plurality of molds as specified above or an apparatus as specified above for manufacturing at least one sole. All annotations regarding the mold and/or the arrangement of molds and/or the apparatus apply to the method in analogous manner and vice versa.

The method may comprise the steps of:

a) closing a/the mold by moving a first mold part, particularly a top part of the mold, relative to a second mold part, particularly a bottom part of the mold, or vice versa;

b) supplying particles to the mold so as to at least partly fill the mold, particularly a mold cavity defined by the mold or respective first and second parts of the mold, with particles;

c) supplying a gaseous and/or liquid medium, e.g. steam, to bond and/or fuse the particles together so as to build the sole;

d) opening the mold and removing, particularly ejecting, the sole from the mold.

All method relevant process parameters may be controlled and monitored by suitable hard- and/or software embodied control and/or monitoring means.

If a multi-layered sole comprising a pre-manufactured outsole and a midsole is to be manufactured, a pre-manufactured outsole may be placed in the mold before the mold is closed.

Step b) thus comprises at least partly filling the mold, particularly a mold cavity defined by the mold or respective first and second parts of the mold, with particles. The particles may be supplied through/via at least one first opening of the mold, the at least one first opening allowing for supplying particles to the mold or a mold cavity, respectively. The particles may be particularly injected by a particle injecting means as specified above in context with the apparatus.

Step c) thus comprises supplying a gaseous and/or liquid medium to bond and/or fuse the particles together so as to build the sole. The gaseous and/or liquid medium may be supplied through/via at least one second opening of the mold, the at least one second opening allowing for supplying the gaseous and/or liquid medium to the mold or a mold cavity, respectively.

It is possible that the particles are compressed before the gaseous and/or liquid medium is supplied to the mold. Thus, a compression force may be applied/exerted to the particles resulting in a compression of the particles. The compression force may be exerted/generated by a relative motion of the first and/or second mold parts relative to each other. Thereby, a first mold part, e.g. top or bottom part of the mold, may at least partly plunge in a second mold part, e.g. a bottom or top part of the mold, or vice versa. The first and/or second mold parts may thus, (also) be moved in a compression position in which a respective compression force is exerted to the particles. A respective compression position is typically positioned in between a respective first and second position of the first and/or second mold part(s) as mentioned above.

The mold may be cooled after supplying the gaseous and/or liquid medium, particularly by spraying a cooling liquid, particularly water, to the mold. Cooling the mold after supplying the gaseous and/or liquid medium, if need be after a specific bonding or fusing time allowing the particles to bond and/or fuse, may reduce cycle times.

4. BRIEF DESCRIPTION OF THE FIGURES

Exemplary embodiments of the present invention will be described in more detail in the subsequent description with reference to the enclosed figures.

5. DETAILED DESCRIPTION OF POSSIBLE EMBODIMENTS

Possible embodiments and variations of the present invention are described in the following with particular reference to a mold for manufacturing a sole. However, the concept of the present invention may identically or similarly be applied to any mold for molding particles.

Figure 1:
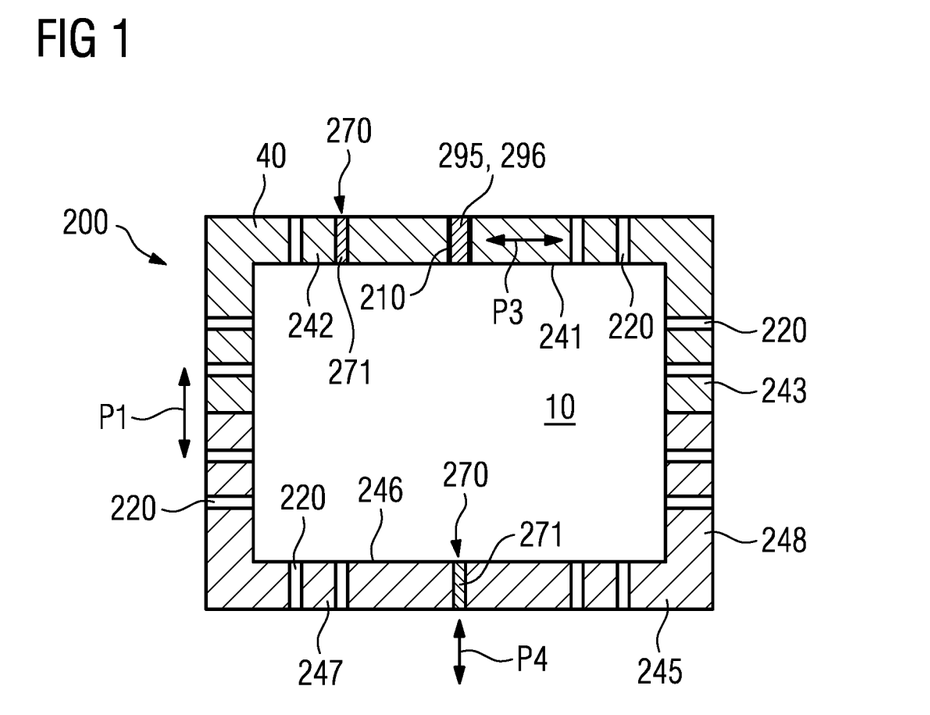
FIG. 1 shows a principle drawing of a mold according to an exemplary embodiment of the invention.

FIG. 1 shows a principle drawing of a mold 200 according to an exemplary embodiment of the invention in a cut-view. The mold 200 is configured to manufacture a sole 140, particularly a midsole 130, from a plurality of expanded or expandable particles 150.

As is apparent from FIG. 1 the mold 200 may comprise a first mold part 240 and a second mold part 245. The first mold part 240 may be deemed or denoted as first mold halve. The second mold part 245 may be deemed or denoted as second mold halve. The first mold part 240 may be a top part of the mold 200. The second mold part 245 may be a bottom part of the mold 200. Each mold part 240, 245 comprises a shaping contour 241, 246 at least partly representing the shape of the sole 140 manufacturable or to be manufactured with the mold 200. The shaping contours 241, 246 of the respective mold parts 240, 245 may be defined by a recessed structure and/or projecting structure in the respective mold parts 240, 245. The shaping contours 241, 246 of the respective mold parts 240, 245 may be defined or delimited, respectively by walls or wall portions, particularly base walls 242, 247 or base wall portions and/or side walls 243, 248 or side wall portions extending off the base walls 242, 247 or base wall portions, of the respective mold parts 240, 245.

The shaping contours 241, 246 of the mold parts 240, 245 define a mold cavity 10. The mold cavity 10 may essentially form the negative of the sole 140 manufacturable or to be manufactured with the mold 200.

The mold parts 240, 245 are moveably supported relative to each other between a first position (not shown) corresponding to an open position or state, respectively of the mold 200 allowing access to the mold cavity 10 and a second position (see FIG. 1) corresponding to a closed position or state, respectively of the mold 200 not allowing access to the mold cavity 10. In other words, a mold part 240, 245 is moveably supported relative to another mold part 240, 245 between a respective first position and a respective second position, A respective relative motion of the mold parts 240, 245 may occur along at least one, particularly translational, motion axis indicated by double-arrow P1.

At least a portion of the mold 200 or mold parts 240, 245 respectively, in particular the entire mold 200 or the entire mold parts 240, 345 are additively manufactured, i.e. manufactured by means of an additive manufacturing method or process, respectively. As an example, a selective laser melting method or process may be used for manufacturing the mold 200 or mold parts 240, 245, respectively. Yet, other additive manufacturing methods or processes are also conceivable.

The mold 200 comprises at least one first opening 210 for supplying the particles 150 into the mold cavity 10. In the embodiment of FIG. 1, the first opening 210 is provided with the first mold part 240. The mold 200 further comprises a plurality of second openings 220 for supplying a gaseous and/or liquid medium, e.g. steam, to bond and/or fuse together the particles 150. In the embodiment of FIG. 1, second openings 220 are provided with both the first and second mold part 240, 245. Yet, it is also conceivable second openings 220 are only provided with the first mold part 240 or the second mold part 245.

As is apparent from FIG. 1, second openings 220 may be provided in base walls 242, 247 and/or side walls 243, 248 of respective mold parts 240, 245. Providing second openings 220 in both the first and second mold part 240, 245, particularly including respective side walls 243, 248 respective mold parts 240, 245, improves the supply of the gaseous and/or liquid medium to bond and/or fuse the particles 150 and thus, bonding and/or fusing the particles 150 so as to form the sole 140. This leads to a sole 140 having even more homogeneous properties 150 as the bonding/fusing together of the particles 150 does not significantly vary throughout the sole 140.

The first and/or second openings 210, 220 may have a circular cross-sectional shape respective first and/or second openings 210, 220 may thus, particularly be implemented as (circular) bores. Yet, the first and/or second openings 210, 220 may be provided with other cross-sectional shapes, e.g. non-circular shapes, particularly polygonal shapes; respective first and/or second openings 210, 220 may thus, be particularly implemented as (square or rectangular) slits. Yet, respective first and/or second openings 210, 220 may also be implemented as triangles, i.e. with a triangular cross-section, which may have special advantages in terms of the structural properties of the mold 200 or mold parts 240, 245, respectively. Independent of its concrete cross-sectional shape, a respective first opening 210 typically differs from a respective second opening 220 in that the cross-sectional area of the first opening 210 is bigger than the cross-sectional area of the second opening 220.

The supply, particularly inflow, of the gaseous and/or liquid medium through the second openings 220 may generally be selectively controlled. For example, the gaseous and/or liquid medium may be supplied through a first group of second openings 220 in the first and/or second mold part 240, 245, and may be removed through a second group of second openings 240 in the first and/or second mold part 240, 245. As such, the gaseous and/or liquid medium may be supplied through second openings 240 not provided in a side wall 243, 248 of a mold part 240, 245, and may be removed by second openings 220 provided in a side wall 243, 248 of a mold part 240, 245.

The mold 200 may further comprise a means 295 for closing the first opening 210. The means 295 may be built as or comprise at least one closing element 296, e.g. a slide element, which is moveably supported relative to the first opening 210 between a first position (not shown) corresponding to an open position or state, respectively of the first opening 210 allowing to supply particles 150 into the mold 200, particularly into the mold cavity 10, and a second position (see FIG. 1) corresponding to a closed position or state, respectively of the first opening 210 not allowing to supply particles 150 into the mold 200, particularly into the mold cavity 10. A respective motion of the at least one moveable closing element 296 may occur along at least one, particularly translational, motion axis as indicated by double-arrow P3.

The mold 200 may further comprise at least one means 270 for ejecting a manufactured sole 140 from the mold 200. A respective means 270 may be built as or comprise at least one ejecting element 271, e.g. an ejecting pin element, which is moveably supported relative to the mold 200 between a first position (see FIG. 1) corresponding to an retracted position or state, respectively not allowing to eject a manufactured sole 140 from the mold 200, particularly the mold cavity 10, and a second position (not shown) corresponding to an extended position or state, respectively allowing to eject a manufactured sole 140 from the mold 200, particularly the mold cavity 10. A respective motion of the at least one moveable ejecting element 271 may occur along at least one, particularly translational, motion axis indicated by double-arrow P4.

Figure 2:
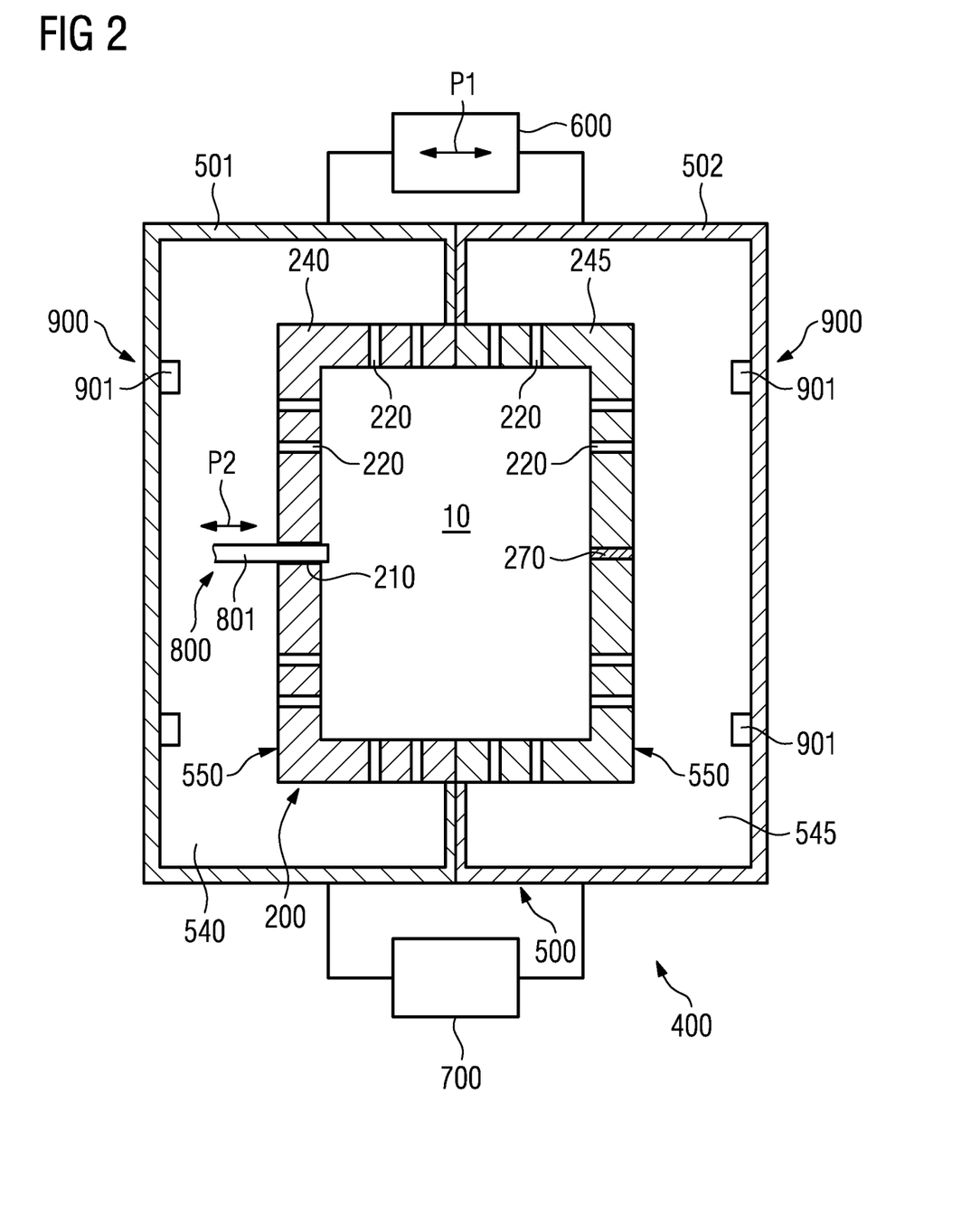
FIG. 2 shows a principle drawing of an apparatus according to an exemplary embodiment of the invention.

FIG. 2 shows a principle drawing of an apparatus 400 according to an exemplary embodiment of the invention in a cut-view.

The apparatus 400 comprises a mold 200 as specified above and a chamber 500 (steam chamber) for generating and/or supplying a gaseous and/or liquid medium, particularly steam, to bond and/or fuse particles 150 within the mold 200. The chamber 500 comprises at least one inner chamber volume which is fillable or filled with the gaseous and/or liquid medium, particularly steam. The inner chamber volume is delimited by walls of the chamber (chamber walls). The chamber 500 further comprises receiving sections 550, 555, particularly recesses, for receiving the mold 200 or respective mold parts 240, 245.

As is apparent from FIG. 2, the chamber 500 may comprise a first chamber part 501 and a second chamber part 502. The first chamber part 501 may be deemed or denoted as first chamber halve. The second chamber part 502 may be deemed or denoted as second chamber halve. Each chamber part 501, 502 may comprise an inner chamber part volume 540, 545. The inner chamber part volumes 540, 545 are delimited by walls of the respective chamber part 501, 502 (chamber part walls). The chamber part walls 501, 502 may be provided with a tempering channel structure (not shown) for a tempering medium, the streaming channel structure comprising at least one tempering channel at least partly extending through the respective chamber part wall. A tempering medium, e.g. a tempering gas and/or liquid, for tempering the respective chamber part may stream within the tempering channel. The inner chamber part volumes 540, 545 of the chamber parts 501, 502 typically, define the chamber volume of the chamber 500.

As is also apparent form FIG. 2, each chamber part 501, 502 comprises at least one receiving section 550, 555 for receiving a respective mold part 240, 245; i.e. each chamber part 501, 502 may receive a mold part 240, 245.

The shape of the receiving sections 550, 555 corresponds to the shape of the mold parts 240, 245 to be received therein so that the mold parts 240, 245 may be nested within the receiving sections 550, 555. By receiving the mold parts 240, 245 in the receiving sections 550, 555, a (mechanical) coupling of the mold parts 240, 245 with the receiving sections 550, 555 is given.

The chamber parts 501, 502 are moveably supported relative to each other at least between a first position (not shown) corresponding to an open position or state, respectively of the chamber 500 allowing access to the mold cavity 10, and a second position (see FIG. 2) corresponding to a closed position or state, respectively of the chamber 500 not allowing access to the mold cavity 10. In other words, a chamber part 501, 502 is moveably supported relative to another chamber part 501, 502 at least between a respective first position and a respective second position. As mentioned before, each chamber part 501, 502 comprises at least one receiving section 550, 555 for receiving a mold part 240, 245. Receiving respective mold parts 240, 245 in respective receiving sections 550, 555 of the chamber parts 501, 502 results in a (mechanical) coupling of the mold parts 240, 245 with the chamber parts 501, 502. Due to the (mechanical) coupling, motions of the chamber parts 501, 502 (relative to each other) result in motions of the mold parts 240, 245 (relative to each other). In other words, the moveable support of the mold parts 240, 245 relative to each other may be implemented by the moveable support of the chamber parts 501, 502 relative to each other. A respective motion of the at least one moveable chamber part 501, 502 may occur along at least one, particularly translational, motion axis which corresponds to the motion axis of the mold parts 240, 245 (see double-arrow P1).

The apparatus 400 may comprise a drive device 600, e.g. built as an or comprising an (electro)hydraulic drive, for generating a drive force for moving the moveable chamber parts 501, 502 and/or mold parts 240, 245, respectively along the respective motion axis. The drive device 600 is thus, directly or indirectly couplable or coupled with the moveable chamber parts 501, 502 and/or mold parts 240, 245, respectively so as to set the moveable chamber parts 501, 502 and/or mold parts 240, 245, respectively in a motion along the respective motion axis.

The inner chamber volumes 540, 545 may be tempered, i.e. particularly heated to a specific (heating) temperature allowing for generating the gaseous and/or liquid medium, particularly steam, which is to be supplied to the mold 200, and/or cooled to a specific (cooling) temperature. Hence, the chamber 500 may be provided with a tempering means (not shown), i.e. a heating and/or cooling means, configured to temper the chamber 500 or the inner chamber volumes 540, 545, respective so as to temper a medium contained within the inner chamber volumes 540, 545.

The apparatus 400 may further comprise a guiding device 700 allocated to the moveable chamber parts 501, 502 and/or the moveable mold pars 240, 245. The guiding device 700 may be configured to allow for a guided motion of the moveable chamber parts 501, 502 or mold parts 240, 245, respectively along the respective motion axis. The guiding device 700 may comprise at least one guiding element (not shown), e.g. a guiding rod or the like, being couplable or coupled with the moveable chamber parts 501, 502 and/or mold parts 240, 245, respectively so as to allow for a guided motion of the moveable chamber parts 501, 502 and/or mold parts 240, 245, respectively along the respective motion axis.

The apparatus 400 may further comprise a particle supplying device 800 configured to supply particles 150 to the mold 200, i.e. to the mold cavity 10. The particle supplying device 800 may comprise at least one particle supplying element 801. The particle supplying element 801 may be built as or comprise a particle injector element. The particle supplying device may thus also be deemed or denoted as a particle injecting device. As is apparent from FIG. 2, the particle supplying or particle injecting device, respectively may at least partly be disposed within or may at least partly extend through the inner chamber volumes. The particle supplying or particle injecting device, respectively may at least partly extend or be extended (see FIG. 2) into a first opening 210 of the mold 200 or a mold part 240, respectively in order to supply particles 150 to the mold 200 or mold cavity 10, respectively.

The apparatus 400 may further comprise a (separate) cooling device 900 for cooling the mold 200 after supplying the gaseous and/or liquid medium, particularly by spraying a cooling liquid, particularly water, to the mold 200, 300. The cooling device 900 may comprise a plurality of spraying elements 901, e.g. in the shape of nozzles, allowing for spraying a cooling liquid, particularly water, to the mold 200, 300 after supplying the gaseous and/or liquid medium, particularly by spraying a cooling liquid, particularly water, to the mold 200, 300.

The chamber 500 may also be at least partly, particularly entirely, additively manufactured. In other words, the chamber 500 may be at least partly, particularly entirely, an additively manufactured component. Additively manufacturing the chamber 500 allows for integrating diverse geometrical and/or functional features in the chamber 500. In particular, the inner chamber volume and the receiving section(s) 550, 555 may be integrated in the chamber 500 by additive manufacturing.

The same applies to respective chamber parts 501, 502. Thus, the chamber parts 501, 502 including respective inner chamber part volumes 540, 545 and receiving sections 550, 555 may be at least partly, particularly entirely, additively manufactured.

Also, the mold 200 may be at least partly, particularly entirely, integrated in the chamber 500 (or vice versa) by additive manufacturing. Hence, the chamber 500 and the mold 200 may be built as at least one common additive component. This means with respect to respective chamber parts 501, 502 and mold parts 240, 245 that at least one mold part 240, 245 may be integrated in a respective chamber part 501, 502 by additive manufacturing. A chamber part 501, 502 and a mold part 240, 245 may thus form one common additive component.

As is apparent from the above, the apparatus 400 may at least partly, particularly entirely, be additively manufactured.

Figure 3:
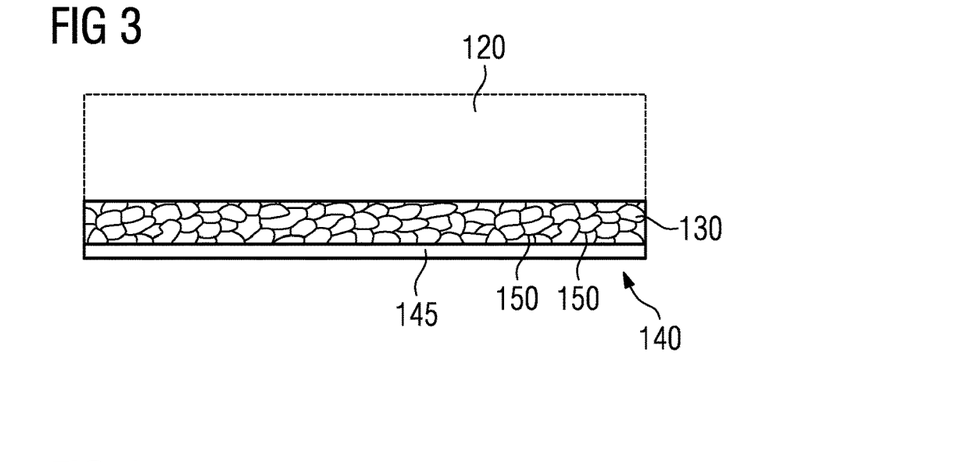
FIG. 3 shows a principle drawing of a sole manufactured with a mold according to an exemplary embodiment of the invention.

FIG. 3 shows a principle drawing of a sole 140 manufactured with a mold 200 according to an exemplary embodiment of the invention in a side-. The sole 140 provides improved performance properties, in particular enhanced cushioning properties. A shoe upper 120 which might be theoretically connected with the sole 140, whereby connecting the shoe upper 120 with the sole 140 does not form part of the invention, is depicted with dotted lines.

As is apparent from FIG. 3, the sole 140 comprises an outsole 145, which may have a specific profile, and a midsole 130. The midsole 130 is manufactured from a large number of particles 150. The particles 150 may be made from an expanded or expandable material such as expanded thermoplastic polyurethane. It is also conceivable that any other appropriate material may be used, for example, any other particle foam suitable for the manufacture of soles 140, for example, ePEBA (expanded polyetherblockamide) or ePA (expanded polyamide).

Moreover, the particles 150 may be randomly arranged or with a certain pattern inside the midsole 130.

Figure 4:
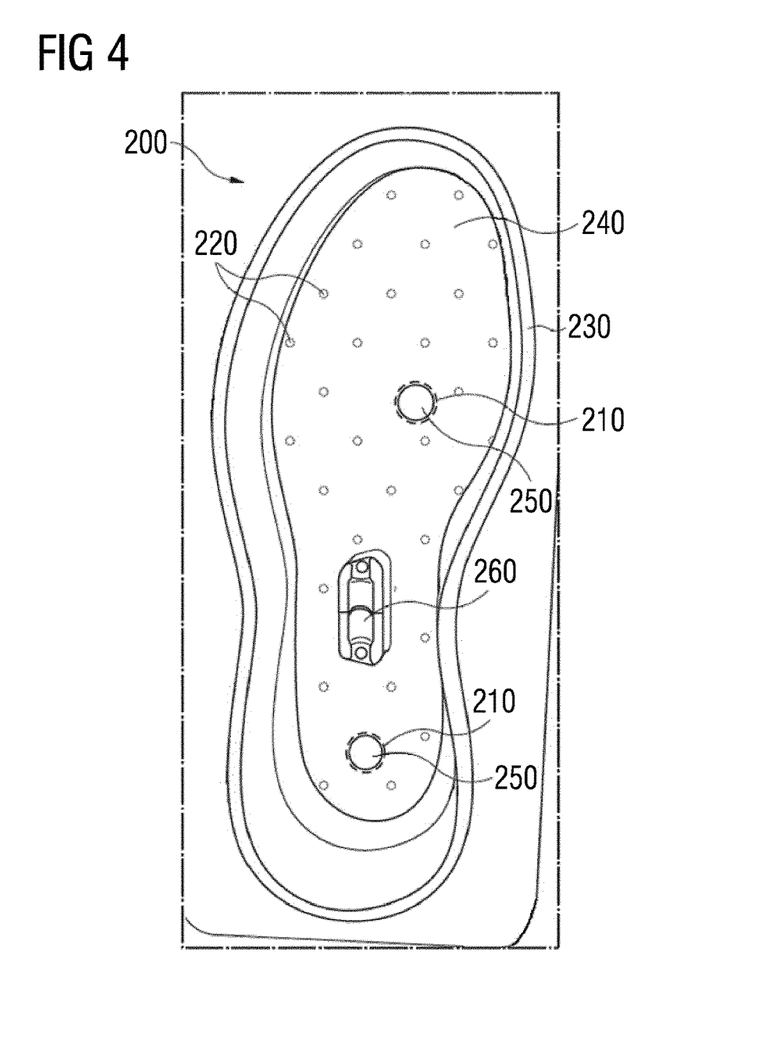
FIG. 4 shows a top view of first mold part of a mold according to an exemplary embodiment of the invention.
Figure 5:
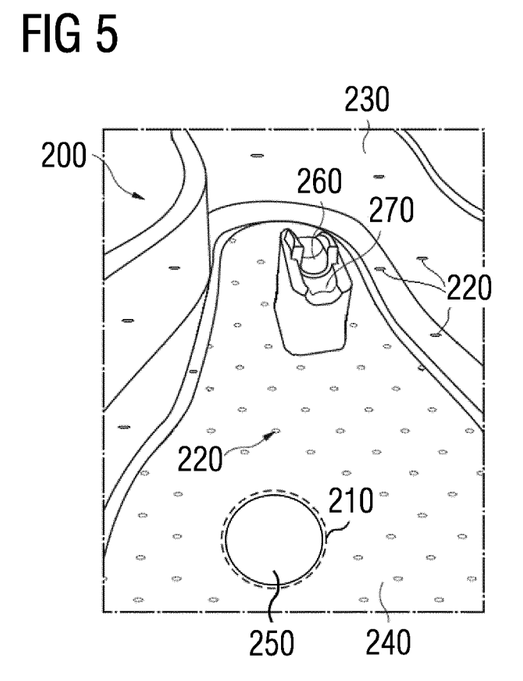
FIG. 5 shows a detailed view of FIG. 4.
Figure 6:
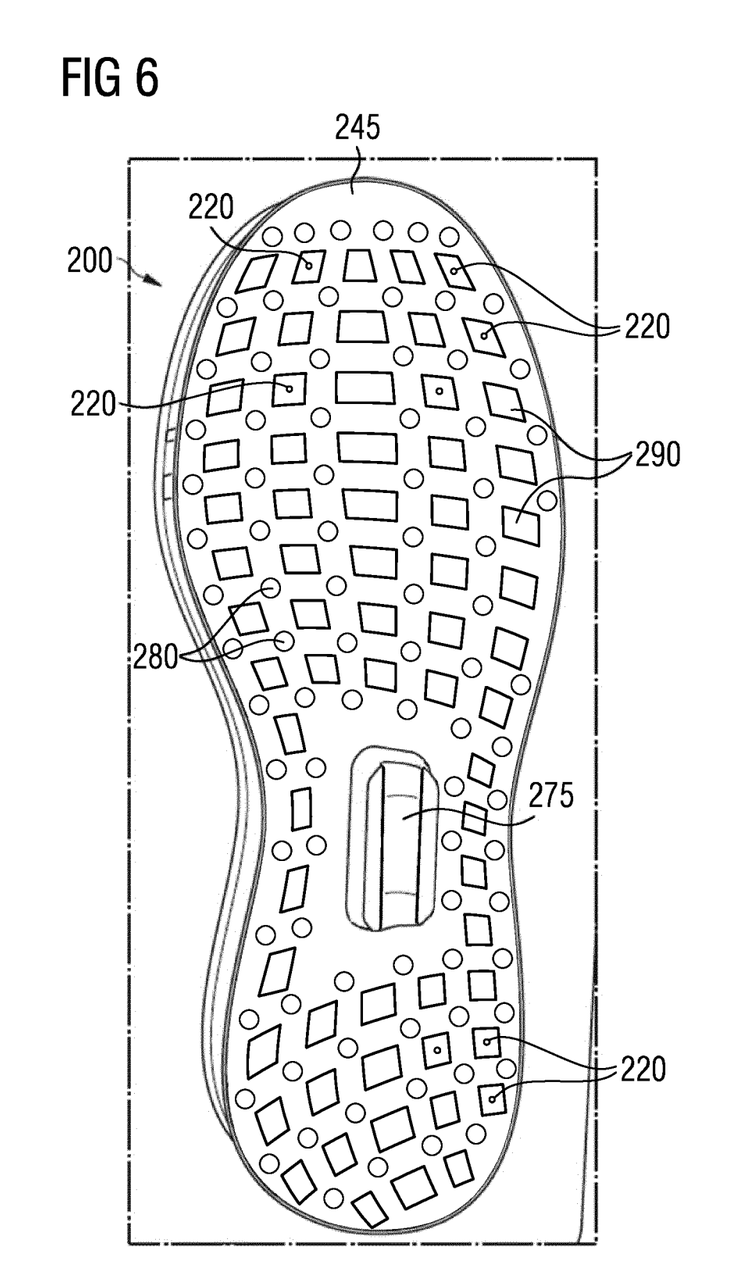
FIG. 6 shows a top view of a second mold part of a mold according to an exemplary embodiment of the invention.

FIGS. 4-6 present certain parts of an exemplary embodiment of a mold 200. FIG. 4 shows a top view of a first mold part 240 and side wall 230 of the mold 200; FIG. 5 shows a more detailed view of FIG. 4 and FIG. 6 shows a top view of a corresponding second mold part 245 of the mold 200. The first mold part 240 may be a top part, the second mold part 245 may be a bottom part of the mold 200.

As is apparent from FIG. 4, the mold 200 comprises at least one first opening 210 for supplying the particles 150. In the embodiment of FIG. 4, two first openings 210 (indicated with dashed circles) are arranged in the first mold part 240 of the mold 200. It is also conceivable that only one or more than two first openings 210 are provided in order to accelerate the supplying of the particles 150 into the mold 200 or mold cavity 10, respectively. In addition, it is also possible that the first openings 210 are provided with different shapes or simply by opening the mold 200. Moreover, respective first openings 210 may also be arranged in other parts of the mold 200.

As mentioned above, the mold 200 further comprises a plurality of second openings 220 for supplying a gaseous and/or liquid medium to bond and/or fuse together the particles 150.

As also mentioned above, at least a part of the mold 200 is manufactured by an additive manufacturing method. Additive manufacturing can create very fine structures that cannot be obtained by traditional mold production techniques, or which are at least difficult or costly to produce. One advantage is therefore that the mass of the mold 200 can be significantly reduced without endangering the mold's stability during the molding process. As a consequence, a lower heat capacity of the mold 200 is obtained. This in turn reduces the loss of energy, when heating the mold 200 and also leads to a faster cooling process as the reduced heat capacity will accelerate the cooling of the mold 200 at the end of the process cycle.

The additive manufacturing of the mold 200 also enables to provide fine structures on the surface of the mold 200, for example a high number of small second openings 220 per surface unit. A precise distribution of second openings 220 may improve the homogenous distribution of the inflow of the gaseous and/or liquid medium, such as steam. As a result, the particles 150 of the sole 140 are uniformly interconnected leading to a high-quality sole 140.

As mentioned before, the gaseous and/or liquid medium to bond and/or fuse together the particles 150 may be steam. Advantageously, steam is not expensive, relatively easy to handle and provides the necessary temperature for the bonding and/or fusing process of certain types of particles 150. Alternatively or in addition, it is also conceivable to provide the necessary energy by using a massless medium such as an electromagnetic wave.

In one embodiment, the at least two second openings 220 may also supply a gaseous and/or liquid medium to cool down the particles 150 after molding. Moreover, the second openings 220 might in one embodiment also serve to remove particles 150 that have not been bonded/fused. This may further reduce the cycle time of the molding process.

In the embodiment of FIG. 4, the second openings 220 are provided as a regular pattern of openings having a smaller length than the size of the particles 150, up to 5.0 mm, preferably up to 4.0 mm, preferably to 3.0 mm and more preferably 0.1 mm to 1 mm. Second openings 220 with such dimensions allow on the one hand the steam or any other medium to reach practically all particles 150 of the sole 140 to be molded. On the other hand, individual particles 150 or even a plurality thereof are not left without support in the mold 200, so that an unintended expansion of such particles 150 into a larger second opening 220 is avoided, which could cause an uneven sole surface. In addition, the waste of production may be reduced as less particles leave the mold 200 through the second openings 220. Moreover, the dense pattern of second openings 220 as shown in FIG. 4 may also favorably contribute to reduce cycle times of the molding process by removing mold material and thus further reducing the heat capacity of the mold 200.

The mold 200 further comprises at least a portion comprising a thickness of equal or less than 10 mm, preferably equal or less than 6 mm and more preferably equal or less than 3 mm. In the embodiment of FIGS. 4 and 5, such a portion may be provided in the side wall 230 and in the first mold part 240 of the mold 200. Moreover, the second mold part 245 as presented in FIG. 6 may also be provided with such a portion. In fact, in one embodiment said portion may comprise essentially the complete mold 200. The indicated thickness values can be easily achieved and the materials can be easily processed by using an additive manufacturing.

In one embodiment, the portion may comprise stainless steel alloys, stainless hot-work steels, precipitation hardening stainless steels, tool steels, aluminum alloys, titanium alloys, commercially pure titanium, hot-work steels, bronze alloys, nickel based alloys, cobalt based alloys, in particular, cobalt chromium tungsten alloys, copper alloys, precious metal alloys. Alternatively or in addition, any other material or a mixture of at least two materials may be used provided the material(s) have appropriate properties such as durability and/or conductivity.

In the embodiment of FIGS. 4 and 5, the second openings 220 are provided in the first mold part 240 and in the side wall 230. Alternatively, it is also possible that the second openings 220 may be provided only in the side wall 230. Such arrangements of the second openings 220 may provide a selective supply of the gaseous and/or liquid medium to bond and/or fuse together the particles 150. Moreover, the total inflow of the gaseous and/or liquid medium may be selectively controlled. For example, the medium may be supplied through the second openings 220 in the first mold part 240 and in the second mold part 245 and may be removed by the second openings 220 in the side wall 230 or vice versa. This may lead to a sole 140 having even more homogeneous properties as the bonding/fusing of the particles 150 does not significantly vary throughout the sole 140. In addition, a maximum energy efficiency can be achieved in such an embodiment as the medium leaving the mold through a well-defined set of second openings 220 might be at least partly recovered.

In the embodiment of FIG. 4, the mold 200 further comprises means 250 for closing the two first openings 210. The means 250 may be embodied as the means 295 for closing the first opening 210 mentioned in context with the exemplary embodiment of FIG. 1. The means 250 may thus be built as or comprise at least one closing element 296, e.g. a slide element.

The mold 200 further comprises a means 260 for holding a functional element (not shown in the FIG.), e.g., a mechanical supporting or stiffening element, inside the mold 200. In the embodiment of FIG. 4, the means 260 for holding a functional element is approximately centrally arranged in the mold 200 between the two first openings 210. Thus, the supporting element will be centrally arranged inside the manufactured sole 140, Moreover, by using the means 260 for holding there may be no need of any adhesives in order to bond the functional element with the particles 150 of the sole 140. Alternatively or in addition, the means 260 for holding may be arranged in a heel portion and/or forefoot portion of the mold 200 depending on the desired performance characteristics for the sole 140. In addition, it is also possible to provide a plurality of means 260 for holding in order to provide more than one functional element for the sole 140 to be manufactured and thereby concertedly provide specific performance characteristics in different parts of the sole 140.

FIG. 5 presents a more detailed view of the mold 200. In FIG. 5, the side wall 230 of the mold 200 further comprises small second openings 220. These fine structures in the side wall 230 may be smaller than the second openings 220 in the first mold part 240. Their sizes and distribution will determine the appearance of the sole 140 when looking from the side, as illustrated in FIG. 3. Such very small second openings 220 would be extremely difficult to manufacture with standard mold manufacturing techniques. However, they are important as they may significantly improve the homogenous distribution of the inflow of the gaseous and/or liquid medium to bond and/or fuse together the particles 150 of the sole 140.

In the embodiment of FIG. 5, the means 260 for holding a functional element inside the mold 200 further comprises (the) at least one means 270 for ejecting a manufactured sole 140 from the mold 200. For example, the means 270 for ejecting may be at least one pin arranged at an end of the means 260 for holding. The pin may be positioned inside the means 260 for holding in a first position. A second position may be that the at least one pin extends out of the means 260 for holding and thus pushes the manufactured sole 140 out of the mold 200. Alternatively or in addition, other means may be provided to remove the molded sole 140 from the mold 200 such as compressed air or even an automatic gripper.

FIG. 6 presents a top view of the second mold part 245 corresponding to the first mold part 240 as presented in FIGS. 4, 5. In the embodiment of FIG. 6, further second openings 220 are provided on the surface of the second mold part 245. They may have the same or different shapes and dimensions compared to the second openings 220 in the first mold part 240.

In the embodiment of FIG. 6, the mold 200 further comprises at least one recess 280 and/or at least one projection 290. In such an embodiment, the plurality of recesses 280 and/or projections 290 may be arranged in such a way to form essentially the negative of a pre-manufactured outsole 145 that can be positioned in the mold 200 prior to the molding process. Second openings 220 may be arranged adjacent to the recesses 280 and/or projections 290 to supply uniformly the gaseous and/or liquid medium to bond and/or fuse together the particles 150 in order to form the midsole 130, whereby the midsole 130 is simultaneously connected to the pre-manufactured outsole 145 positioned in the mold 200, Alternatively or in addition, the at least one recess 280 and/or the at least one projection 290 to position the pre-manufactured outsole 145 may be provided in the first mold part 240 of the mold 200, In any case, a further optimized and automated process for manufacturing soles 140 can be provided.

As mentioned before, the outsole 145 may be pre-manufactured, for example by injection molding, compression molding, thermoforming, or any other methods of converting 2D design to 3D moldings known to the person skilled in the art. Alternatively, the outsole 145 may at least partly be formed or molded in the second mold part 245 of the mold 200 of FIG. 6, For example, a raw strip of outsole material can be positioned in the mold 200, which is then heated during molding of the particles 150 and only then assumes the final outsole shape and at the same time connects to the molded particles 150.

In the embodiment of FIG. 6, the mold 200 further comprises a further means 275 for holding a functional element (not shown), e.g. a supporting element (not shown) inside the mold 200 corresponding to the means 260 for holding in the first mold part 240 as presented in FIGS. 4, 5.

Figure 7:
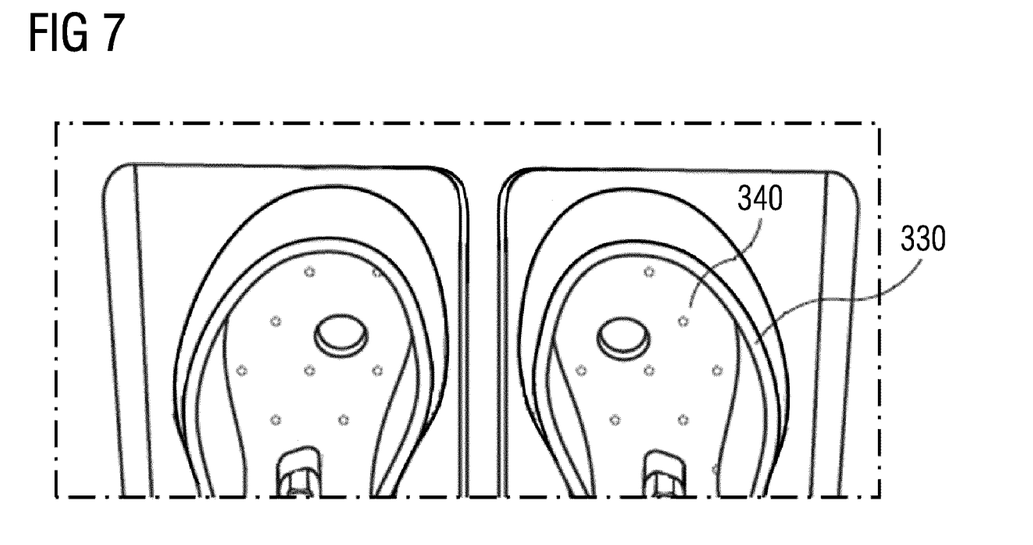
FIGS. 7, 8 show the first and second mold parts of an arrangement of a plurality of molds according to an exemplary embodiment of the invention.
Figure 8:
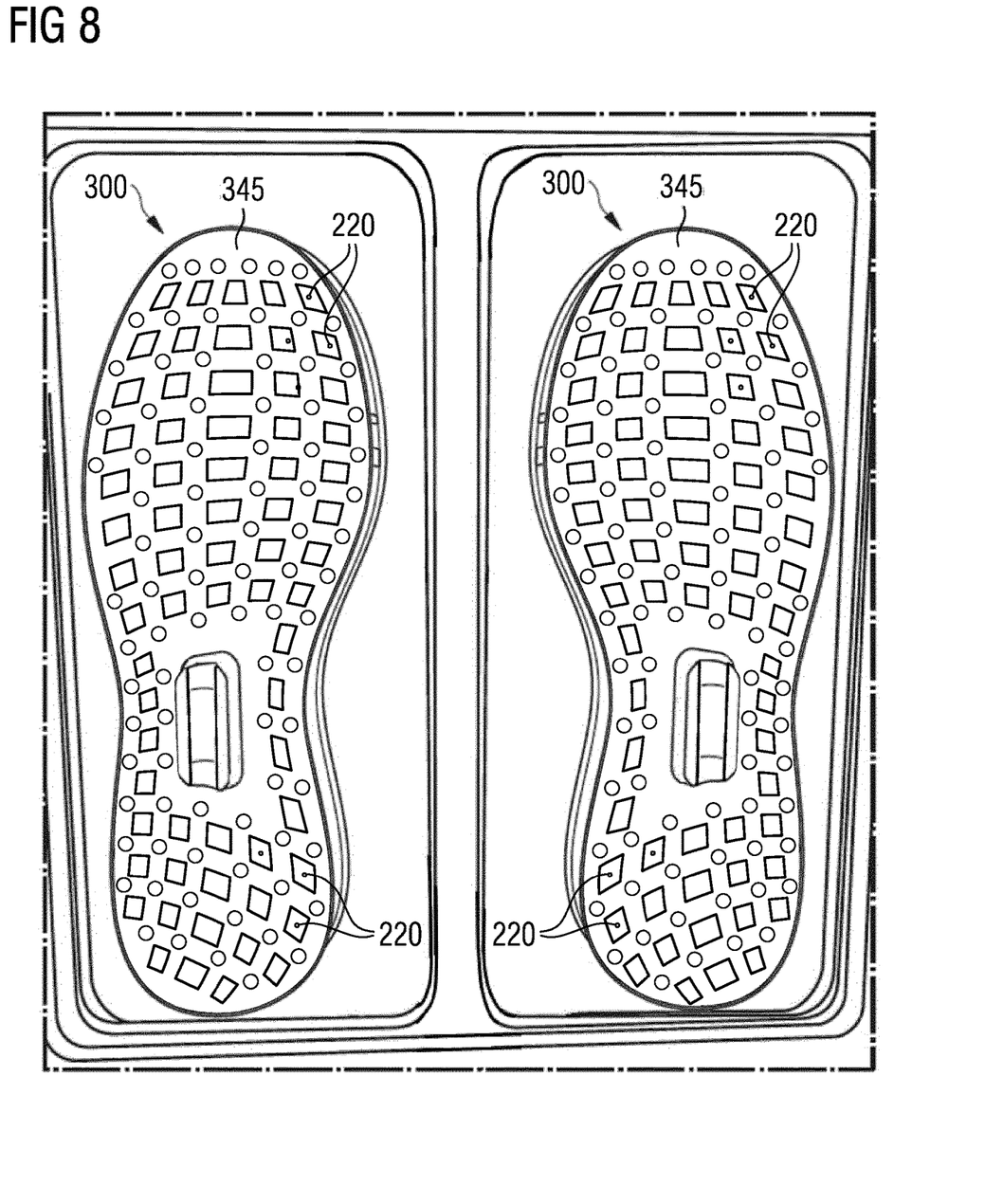

FIGS. 7, 8 show the first and second mold parts of an arrangement of a plurality of molds 300 according to an exemplary embodiment of the invention in a top-view.

FIG. 7 presents the first mold parts 340 (e.g. top parts) as well as the side walls 330 and FIG. 8 presents the second mold parts 245 (e.g. bottom parts) of the molds 300. Each of the molds 300 may comprise one or more of the above explained features of the embodiment in FIGS. 1-6.

Combining several molds 300 may allow for automatically manufacturing a plurality of soles 140 including e.g. a midsole 130 and an outsole 145 in one single process. The aforementioned advantages of the molds 200 may thus be upscaled to any plurality as required for a cost and energy efficient sole production, More specifically, the infrastructure to supply the molds 300 with the gaseous and/or liquid medium may be shared among several molds 300. For example, the gaseous and/or liquid medium may be supplied by one or more common channels leading to the second openings 200 in the first mold parts 340 and/or the second mold parts 345 and/or the side walls 330 of each mold 300. Similarly, heating and cooling units may be shared for several molds 300 in the arrangement of FIGS. 7, 8. This may further reduce the overall costs for the automated manufacture of a large number of soles 140.

Although not depicted in the Fig. it is also possible that a respective shaping contour 241, 246 is provided with a mold insert which is to be inserted in a respective receiving section of the mold 200 or mold parts 240, 245 being configured to receive a respective mold insert. In such a case, the mold insert may at least partly be additively manufactured. The mold 200 may thus, comprise at least one mold insert.

The mold 200, 300 shown in the Fig. allows for implementing a method for manufacturing at least one sole 140 from a plurality of particles 150, particularly expanded or expandable particles. In other words, the molds 200, 300 may be used for manufacturing at least one sole 140.

The method may comprise the steps of:

a) closing a/the mold 200, 300 by moving a first mold part 240, particularly a top part of the mold 200, 300, relative to a second mold part 245, particularly a bottom part of the mold, or vice versa;

b) supplying particles 150 to the mold 200, 300 so as to at least partly fill the mold 200 300, particularly a mold cavity 10 defined by the mold 200, 300 or respective first and second mold parts 240, 245, with particles 150;

c) supplying a gaseous and/or liquid medium, e.g. steam, to bond and/or fuse the particles 150 together so as to build the sole 140;

d) opening the mold 200, 300 and removing, particularly ejecting, the sole 140 from the mold 200, 300.

All method relevant process parameters may be controlled and monitored by suitable hard- and/or software embodied control and/or monitoring means.

If a multi-layered sole 140 comprising a pre-manufactured outsole 145 and a midsole 130 is to be manufactured, a pre-manufactured outsole 145 may be placed in the mold 200, 300 before the mold 200, 300 is closed.

Step b) thus comprises at least partly filling the mold 200, 300, particularly a mold cavity 10 defined by the mold 200, 300 or respective first and second mold parts 240, 245, with particles 150. The particles 150 may be supplied through/via at least one first opening 210 of the mold 200, 300, the at least one first opening 210 allowing for supplying particles 150 to the mold 210 or the mold cavity 10, respectively. The particles 150 may be particularly injected by a particle injecting means as specified above in context with the apparatus 400.

Step c) thus comprises supplying a gaseous and/or liquid medium to bond and/or fuse the particles 150 together so as to build the sole 140. The gaseous and/or liquid medium may be supplied through/via at least one second opening 220 of the mold 200, 300, the at least one second opening 220 allowing for supplying the gaseous and/or liquid medium to the mold 200, 300 or the mold cavity 10, respectively.

It is possible that the particles 150 are compressed before the gaseous and/or liquid medium is supplied to the mold 200, 300. Thus, a compression force may be applied/exerted to the particles 150 resulting in a compression of the particles 150. The compression force may be exerted/generated by a relative motion of the first and/or second mold parts 240, 245 relative to each other. Thereby, a first mold part 240, e.g. top or bottom part of the mold 200, 300, may at least partly plunge in a second mold part 245, e.g. a bottom or top part of the mold 200, 300, or vice versa. The first and/or second mold parts 240, 245 may thus, (also) be moved in a compression position in which a respective compression force is exerted to the particles 150. A respective compression position is typically positioned in between a respective first and second position of the mold part(s) 240, 245 as mentioned above.

The mold 200, 300 may be cooled after supplying the gaseous and/or liquid medium, particularly by spraying a cooling liquid, particularly water, to the mold 200, 300. Cooling the mold 200, 300 after supplying the gaseous and/or liquid medium, if need be after a specific bonding or fusing time allowing the particles 150 to bond and/or fuse, may reduce cycle times.

A single feature, a plurality of features, or all features mentioned in context with a specific embodiment may be combined with a single feature, a plurality of features, or all features mentioned in context with another specific embodiment. Hence, all embodiments may be arbitrarily combined with each other.

The invention claimed is:

1. A method for manufacturing at least one sole from a plurality of particles, wherein an apparatus is used for manufacturing the at least one sole, wherein the apparatus comprises:
   a mold for manufacturing a sole from a plurality of particles, the mold comprising:
      at least one first opening for supplying the particles;
      at least two second openings for supplying a gaseous and/or liquid medium to bond and/or fuse the particles together; wherein
      at least a portion of the mold is manufactured by an additive manufacturing method;
   a chamber for generating and/or supplying a gaseous and/or liquid medium, the chamber comprising:
      at least one inner chamber volume which is fillable or filled with the gaseous and/or liquid medium, and
      at least one receiving section for at least partly receiving the mold,
   the method comprising:
      a) closing the mold by moving a first mold part relative to a second mold part, or vice-versa;
      b) supplying particles so as to at least partly fill the mold with particles;
      c) supplying a gaseous and/or liquid medium to bond and/or fuse the particles together so as to build the sole; and
      d) opening the mold and removing the sole from the mold.

2. An apparatus for manufacturing at least one sole from a plurality of particles, wherein the apparatus comprises:
   a mold for manufacturing a sole from a plurality of particles, the mold comprising:
      at least one first opening for supplying the particles;
      at least two second openings for supplying a gaseous and/or liquid medium to bond and/or fuse the particles together; wherein
      at least a portion of the mold is manufactured by an additive manufacturing method;
   a chamber for generating and/or supplying a gaseous and/or liquid medium, the chamber comprising:
      at least one inner chamber volume which is fillable or filled with the gaseous and/or liquid medium, and
      at least one receiving section for at least partly receiving the mold.

3. The apparatus according to claim 2, wherein at least one dimension of each of the at least two second openings is smaller than the average size of the particles to be molded in old.

4. The apparatus according to claim 2, wherein e second openings are provided with a smallest dimension of up to 5.0 mm.

5. The apparatus according to claim 2, wherein at least a portion of the mold comprises a thickness of equal or less than 10 mm.

6. The apparatus according to claim 2, wherein the mold comprises a first part and a second part, wherein second openings are provided in a side wall of the first part and/or second part.

7. The apparatus according to claim 6 wherein the at least two mold parts are moveably supported relative to each other at least between a first position corresponding to an open position or state, respectively of the mold allowing access to the mold cavity and a second position corresponding to a closed position or state, respectively of the mold not allowing access to the mold cavity.

8. The apparatus according to claim 2, further comprising at least one recess and/or at least one projection for holding and/or positioning at least ne pre-manufactured outsole.

9. The apparatus according to claim 2, further comprising a holder for holding and/or positioning at least ne functional element of the sole inside the mold.

10. The apparatus according to claim 2, wherein the mold comprises an ejector for ejecting a manufactured sole from the mold.

11. The apparatus according to claim 2, wherein the at least two chamber parts are moveably supported relative to each other between a first position corresponding to an open position or state, respectively of the chamber allowing access to the mold cavity and a second position corresponding to a closed position or state, respectively of the chamber not allowing access to the mold cavity.

12. The method according to claim 1, wherein the particles are compressed before the gaseous and/or liquid medium is supplied to the mold.

* * * * *